Figure 3:
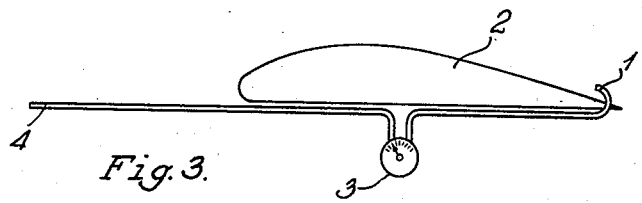

Sept. 29, 1942.  F. HOPPE  2,297,412
APPARATUS FOR INDICATING THE APPROACH TO THE
STALLED CONDITION OF AIRPLANES
Filed Nov. 27, 1939  2 Sheets-Sheet 1
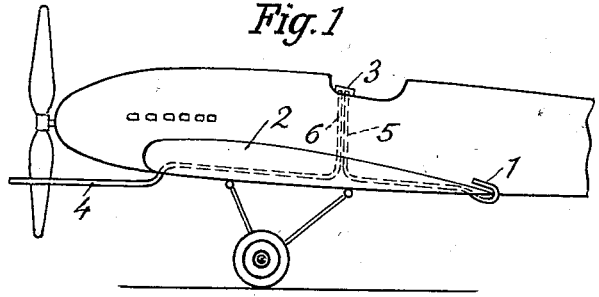
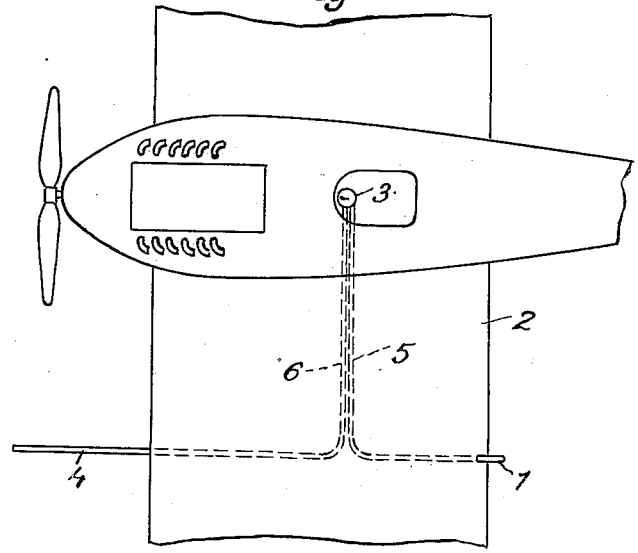
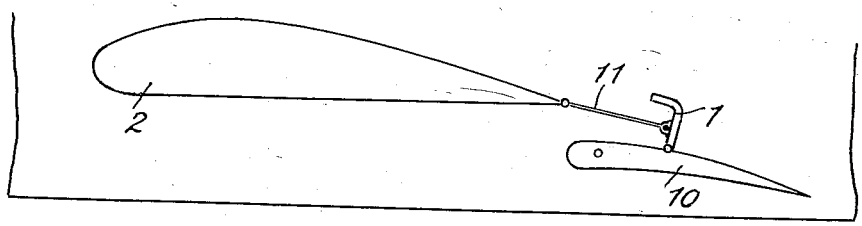
Inventor
Fritz Hoppe
by his attorneys
Howson and Howson Sept. 29, 1942.   F. HOPPE   2,297,412
APPARATUS FOR INDICATING THE APPROACH TO THE
STALLED CONDITION OF AIRPLANES
Filed Nov. 27, 1939   2 Sheets-Sheet 2

INVENTOR
FRITZ HOPPE
BY HIS ATTORNEYS
Howson and Howson

Patented Sept. 29, 1942

2,297,412

UNITED STATES PATENT OFFICE 2,297,412

APPARATUS FOR INDICATING THE APPROACH TO THE STALLED CONDITION OF AIRPLANES

Fritz Hoppe, Kopenick-Wendenschloss, near Berlin, Germany; vested in the Alien Property Custodian Application November 27, 1939, Serial No. 306,391
In Germany December 20, 1938

5 Claims. (Cl. 73—152)

One of the points of danger in aeronautics is in the fact, that the lift of the wing does not increase continuously with the increase of the angle of incidence, but it will reach its maximum in proximity of the critical angle of incidence and it will even decrease thereafter. If an airplane is brought into this condition by mistake it will pancake or tilt sideways and spin. Frequently apparatus have been suggested, which upon the airplane reaching this condition will give the pilot a signal or which will directly influence the steering of the craft. These apparatus mostly depend on measuring the dynamic or impact pressure or measuring the angle of incidence when flying, and for that reason they must be specially adapted to the characteristics of the individual airplane or they must be adjusted to such craft, and consequently the said apparatus failed to gain a footing in practice.

The present invention is based upon the fact, that upon approaching the critical angle of incidence, the total pressure on the upper surface of the wings will decrease, which will cause the breaking away of the air flow from the wing surface and consequently a decrease of the lift. Thus according to the invention a measuring tube is mounted above the upper surface of the wing in such a position, that it will not be subjected to the action of the boundary layer at the wing during normal flying conditions but is influenced by this boundary layer when the airplane approaches the stalled condition and in addition to this a second measuring tube is provided within the free flow of air. The difference in pressure in both measuring tubes serves either for indicating the danger condition due to approaching the critical angle of incidence or as an impulse sender, in that for instance, a direct action is caused upon the steering or control of the craft through the nascent difference in pressure, in order to return the airplane to its normal position.

In the drawings four modifications of the apparatus embodying the invention are illustrated and it is:

Figure 1 a side view of an airplane with the apparatus according to the invention, Figure 2 a plan view thereof, Figures 3 to 6 modifications of the apparatus represented diagrammatically.

Figure 7:
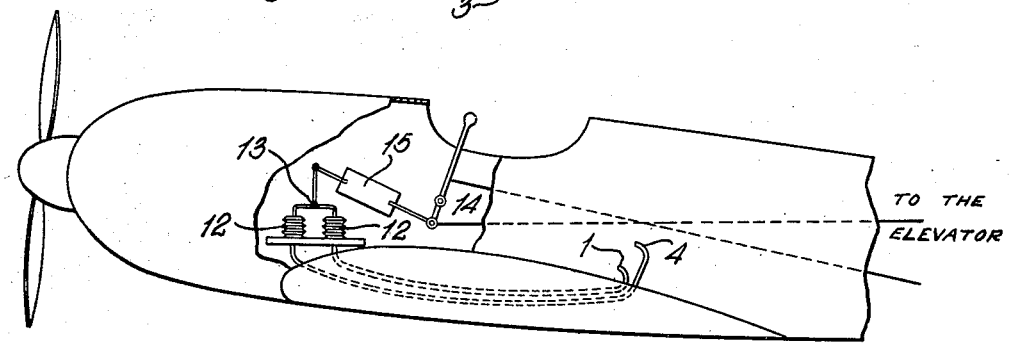
Figure 8:
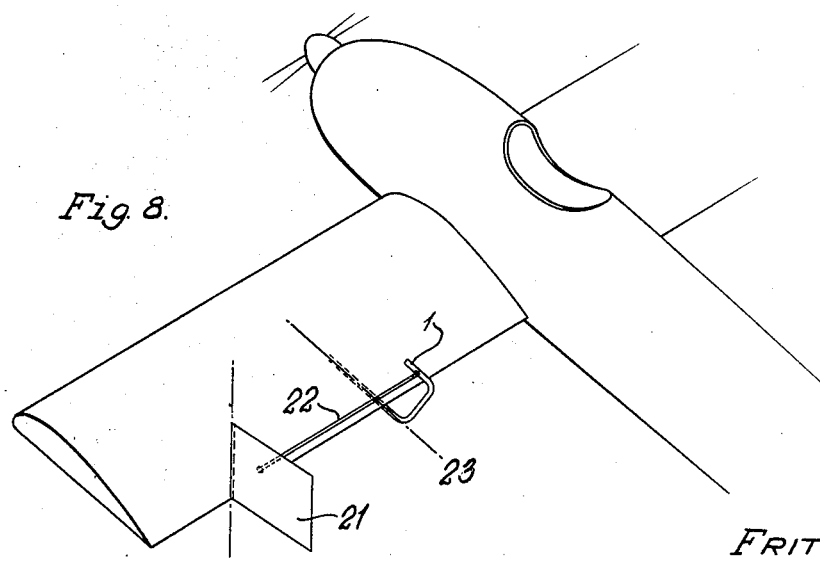

Fig. 7 is a diagrammatic view showing the application of the invention to the control of an airplane; and Fig. 8 is a diagrammatic view showing a construction in which the measuring tube is maintained in the most desirable position with respect to the wing by a vane.

As shown in Figures 1 to 3 a measuring tube 1 (Pitot or Brabbé tube) for the total pressure or a similar tube facing with its measuring opening the flow of air is mounted above the upper surface of the wing 2, in most instances far away in the rear, and the local total pressure ascertained there is compared in a differential manometer 3 with the undisturbed total pressure, measured with a similar tube 4 at a sufficient distance from the wing 2. The two tubes 1 and 4 are connected with the manometer 3 by pipe lines 5 and 6 respectively. The manometer 3 is arranged on the instrument board of the airplane. Under normal conditions of travel the boundary layer of the wing 2 is so narrow, that it will not reach the said Pitot tube 1. Consequently the pressures ascertained by means of the two Pitot tubes are equal and the differential manometer will indicate zero. Shortly before the dangerous breaking away of the air flow occurs, the boundary layer will have reached the Pitot tube on the upper surface of the wing, so that the pressure thereof will decrease with growing danger and the differential manometer will act and thus warn the pilot. The opening of the speed indicating apparatus provided in all airplanes may be used as second Pitot tube.

Figure 4:
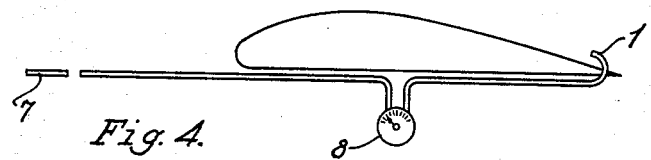

A further advantage is obtained, if according to Figure 4 not the total pressure in front of the wing is chosen as comparing pressure, but the undisturbed statical pressure measured in the usual manner, for instance by means of a Pitot static tube 7 mounted ahead of the wing, while the speed indicator 8 proper is used as indicating device. By this the mounting of additional apparatus on the instrument panel to indicate air speed may be dispensed with. For under normal flying conditions the apparatus will operate like a normal speed indicator, but upon the plane approaching the stalled condition the pointer will not remain on the mark for minimum dynamic or impact pressure like a customary speed indicator, but it will drop down further and further with growing danger of the breaking away of the air flow and thus give to the pilot an unambiguous warning.

Figure 5:
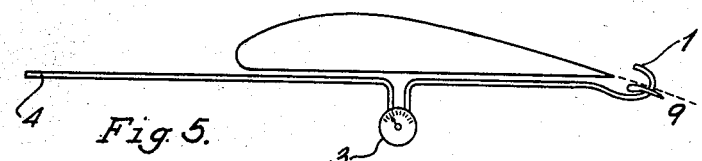

Moreover it is not necessary, to arrange the measuring tube 1 directly above the wing, according to the invention the measuring tube may be also arranged in the rear of the wing. However, it is essential, that also in this instance the measuring tube is located above the wing, that is to say, above the tangential extension of the wing rearwards. Such an arrangement is illustrated in Figure 5, from which it may be seen, that the measuring tube 1 is arranged in the rear of the wing 2, but it is located above the wing within the meaning of the invention, which wing is extended towards the rear by the dot-and-dash tangent 9.

With airplanes having landing flaps sometimes the aero-dynamic properties of the wing are so highly dependent on the position of said flaps, that the place of mounting of the measuring tube suitable with an elevated flap will not suffice with the flap turned down. In such instances according to Figure 6 the measuring tube 1 is pivoted on the landing flap 10 and connected by the coupling means 11 to the wing 2 in such a manner, that it will assume each time the most favorable position. The same remarks apply to double section wings, forward wings, other movable constructional parts. Sometimes the requisite action will be obtainable through coupling with a vane or any other element exposed to the current of the air as shown in Fig. 8 in which a vane 21 is pivotally mounted on the wing and connected by a rod 22 to the measuring tube 1. The measuring tube is pivotally mounted so that if the plane slips to one side or the other the vane 21 is rotated about its support and, through the bar 22, shifts the end of the measuring tube 1 with respect to the wing surface.

As shown in Fig. 7 the difference in the pressures in the tubes may be used to operate the steering mechanism. As shown in this figure, the tube 1 is the measuring tube subjected to the boundary layer pressure as the plane approaches a stalled condition and the tube 4 is the second measuring tube located in the free flow of air. The measuring tubes are connected by pipes to the collapsible chambers 12. The difference in the pressures in the chambers 12 causes the lever 13 to shift and thus to control a power booster or servo-motor 15 connected with the control lever 14 and controlling the elevator in accordance with the pressure difference of the tubes 1 and 4. The operation of the lever 14 under the control of the pressure tubes 1 and 4 gives an indication of the approach to the stalled condition for the plane as well as operating the elevator to correct such condition.

I claim:

1. A device for indicating the approach to the stalled condition of airplanes, comprising in combination: a Pitot measuring tube having a dynamic opening facing the direction of travel of the airplane and mounted downstream of the leading edge of the wing and above the upper surface of the wing at such a distance that it will not be reached by the boundary layer during normal flying conditions but is influenced by this boundary layer when approaching the stalled condition, a second measuring tube arranged within the free flow of air and means for indicating the difference in the pressures in said tubes.

2. A device for indicating the approach to the stalled condition of airplanes, comprising in combination: a Pitot measuring tube having a dynamic opening facing the direction of travel of the airplane and mounted downstream of the leading edge of the wing and above the upper surface of the wing at such a distance that it will not be reached by the boundary layer during normal flying conditions but is influenced by this boundary layer when approaching the stalled condition, a static pressure tube arranged within the free flow of air and means responsive to the pressures in said tubes.

3. A device for indicating the approach to the stalled condition of airplanes, comprising in combination: a Pitot measuring tube having a dynamic opening facing the direction of travel of the airplane and mounted downstream of the leading edge of the wing and above the upper surface of the wing at such a distance that it will not be reached by the boundary layer during normal flying conditions but is influenced by this boundary layer when approaching the stalled condition, a second measuring tube arranged within the free flow of air, means for indicating the difference in the pressures in said tubes and means coupled with the first measuring tube in such a manner that by movement of said second means the first measuring tube will always assume its most favorable position.

4. A device for indicating the approach to the stalled condition of airplanes, comprising in combination: a Pitot measuring tube having a dynamic opening facing the direction of travel of the airplane and mounted downstream of the leading edge of the wing and above the upper surface of the wing at such a distance that it will not be reached by the boundary layer during normal flying conditions but is influenced by this boundary layer when approaching the stalled condition, a second measuring tube arranged within the free flow of air, means for indicating the difference in pressures in said tubes and a flap coupled with the first measuring tube in such a manner that the latter will always assume its most favorable position.

5. A device for indicating the approach to the stalled condition of airplanes, comprising in combination: a Pitot measuring tube having a dynamic opening facing the direction of travel of the airplane and mounted downstream of the leading edge of the wing and above the upper surface of the wing at such a distance that it will not be reached by the boundary layer during normal flying conditions but is influenced by this boundary layer when approaching the stalled condition, a second measuring tube arranged within the free flow of air, means for indicating the difference in the pressures in said tubes and an element movable with respect to the wing coupled with the first measuring tube in such a manner that the latter will always assume its most favorable position.

FRITZ HOPPE.